United States Patent [19]

Smrt et al.

[11] Patent Number: 5,035,920

[45] Date of Patent: Jul. 30, 1991

[54] TWO-STEP METHOD FOR INCREASING THE LIGHT-REFLECTIVITY OF AN OBJECT

[75] Inventors: Thomas J. Smrt, Marengo; Abdul F. Khan, Hoffman Estates, both of Ill.

[73] Assignee: Fox Valley Systems, Inc., Cary, Ill.

[21] Appl. No.: 383,822

[22] Filed: Jul. 21, 1989

[51] Int. Cl.$^5$ .............................. B05D 1/36
[52] U.S. Cl. ........................... 427/202; 427/204; 427/208.8; 427/214; 427/261; 427/333; 427/335; 427/340; 106/489; 523/172
[58] Field of Search ............ 427/197, 202, 204, 208.8, 427/214, 261, 264, 271, 333, 335, 340, 344, 407.1, 421, 427, 196; 118/308, 310, 313, 314, 315; 106/287.34, 489; 523/172, 223; 428/325, 406

[56] References Cited

U.S. PATENT DOCUMENTS

| | | | |
|---|---|---|---|
| Re. 30,892 | 3/1982 | Bingham et al. | 427/163 |
| 2,574,971 | 11/1951 | Heltzer | 523/172 |
| 2,963,378 | 12/1960 | Palmquist et al. | 106/1.25 |
| 3,099,637 | 7/1963 | Nellessen | 523/223 |
| 3,168,411 | 2/1965 | Walsh | 427/196 |
| 3,228,897 | 1/1966 | Nellessen | 106/196 |
| 3,247,153 | 4/1966 | de Vries | 523/172 |
| 3,490,934 | 1/1970 | Oakley et al. | 427/196 |
| 4,168,332 | 9/1979 | Leinen et al. | 427/162 |
| 4,329,393 | 5/1982 | LaPerre et al. | 428/325 |
| 4,482,662 | 11/1984 | Rapaport et al. | 523/504 |
| 4,814,201 | 3/1989 | Smith | 427/196 |
| 4,833,025 | 5/1989 | Rossi | 427/196 |

FOREIGN PATENT DOCUMENTS 51-69535  6/1976  Japan .................... 523/172

Primary Examiner—Shrive Beck
Assistant Examiner—Terry J. Owens
Attorney, Agent, or Firm—Leydig, Voit & Mayer

[57] ABSTRACT

A two-part system and method for increasing the reflex-reflectivity of a substrate is disclosed wherein a first aerosol dispensing means containing a first coating composition capable of forming a base coating on a substrate and a second aerosol dispensing means containing a second coating composition capable of imparting reflex-reflectivity to the base coating is employed. The first coating composition comprises a binder resin and a solvent in which the binder resin is dissolved and the second coating composition contains transparent microspheres having a particle size from about 45 to about 90 microns and a carrier in which the transparent microspheres are dispersible. The substrate is coated first with the first coating composition via aerosol means to form a base coating which is subsequently coated with the second coating to impart reflex-reflectivity to the base coating.

8 Claims, No Drawings

TWO-STEP METHOD FOR INCREASING THE LIGHT-REFLECTIVITY OF AN OBJECT

BACKGROUND OF THE INVENTION

The present invention relates to the field of aerosols, in general, and to aerosol coating compositions, in particular.

The need to increase the night-time or low light visibility of objects, such as signs, has plagued mankind for centuries. For many apparent reasons, the need to read signs, such as highway roadsigns, or to be made aware of certain potentially dangerous conditions, is more critical at night than during daylight hours. Accordingly, reflectorized coatings or surfaces have been developed for the purpose of increasing the night-time or low-light visibility of objects. Such reflectorized surfaces then act to reflect or return incident light, as from an automobile headlight, back generally toward the source of such light. Unfortunately, the production of reflectorized signs or objects generally has required special processing techniques which are commercially performed only by a limited number of establishments. The costs for such commercially produced objects have been relatively high and essentially prohibitive when only a limited quantity of specialized signs or the like are desired.

A need therefore has existed for a means to render common objects, such as signs, reflective, without great expense. U.S. Pat. No. 2,354,018 is directed toward what was believed to be one possible solution to such a need. In that patent there is disclosed a light reflective beaded sheet material, designed to be adhesively affixed to objects, including pre-existing signs, and the like. However, the sheet material incorporates either a pigmented sizing film or a reflector sizing coat in the sheet material which then obscures any underlying printing or the like on the substrate, requiring then careful cutting of lettering into or from the sheet material, to construct any desired sign. That solution is not believed to have found acceptance, perhaps due to the inability to form weather-resistant adhesive bonds to the underlying substrate, or perhaps due to the cumbersome need to carefully cut the material into the desired shapes and patterns. More likely, the lack of convenience of such an approach has been responsible for its lack of acceptance.

Another factor of concern in this field is the ability to quickly increase the night or low-light visibility of an object, as may be necessary in an emergency situation. In the past, emergency situations, such as the need to warn of a stalled car or other object on or near a highway, have been addressed by placing mobile, reflectorized objects near the obstruction. Such an approach is unsatisfactory, however, because it does not highlight the obstruction itself and in fact tends to attract a driver's attention to the reflectorized object and away from the obstruction of concern.

It is clear that a need also has existed for a means to increase the night-time or low light visibility of an object in a reasonably rapid manner, without distracting an observer's attention away from the object itself. U.S. Pat. No. 3,099,637 is concerned with certain compositions which evidently were believed to be useful for converting ordinary reflective surfaces into reflex-reflecting ones. The compositions contain glass beads having diameters preferably between about 15 and 60 microns and are said to be sprayable. No mention is made of application of such compositions via aerosol means.

The compositions of the '637 patent have not found general acceptance, perhaps at least in part due to the lack of an easy means to apply the same. The patent suggests application by means of classical brushing technique, which is cumbersome and not readily applicable in emergency situations. Further, it is difficult to achieve, through brushing, a thin, uniform surface layer which will not be readily noticed in daylight or normal ambient light conditions.

Others also have suggested the application of various types of glass beads, for purposes of increasing visibility of objects or areas. For example, U.S. Pat. No. 2,574,971 concern certain highway marking paint which contains glass beads. The paint is said to be sprayable, assumedly through the use of typical spray gun technology, due to its early date (1951). Re. 30,892 is concerned with a composition used to retro-reflectively treat fabrics, the composition including transparent microspheres and specular reflective means underlying the microspheres to make the microspheres retro-reflective. As a general principle, for nonaerosol applications of glass beads, those skilled in that art have recognized that larger glass beads afford better reflectivity than smaller glass beads.

Aerosol means of application of certain small-sized glass beads has been suggested in the art. In U.S. Pat. No. 2,963,378, there is suggested the use of glass beads having an optimum size, in accordance with that reference, of 10 to 50 microns in diameter for certain formulations which include aerosols. The beads are reflectorized by a metallic coating over approximately one-half of their surface. The formulations are purportedly for use in providing coatings for highway signs and markers that have long-range visibility when viewed at night.

U.S. Pat. No. 3,228,897 relates to certain coating compositions containing glass beads which are stated to be capable of application by various techniques, including spray methods. The patent contains one example of a composition indicated to be of use in an aerosol container, although no actual example of an aerosol formulation is present. The beads are indicated to have a particle size of about 25 to about 75 microns, but only glass beads having particle sizes in the 20–45 micron size range are actually used in the working examples. Further, the beads are applied in combination with a reflective metallic pigment which acts to form reflective back surfaces for the glass beads.

Despite the fact that glass bead aerosol formulations are suggested in the foregoing references which have been in existence for decades, no actual commercial use of such formulations is known.

Of more recent era, U.S. Pat. No. 4,329,393 discusses the use of hemispherically coated glass beads having a particle size in the range of 10 to 60 microns, but with a particle size of 10 to 50 microns for aerosol application, for the purpose of speeding recognition of the location of certain microparticles or taggants on a labeled object. The beads are used to reflectorize and thus highlight the location of the microtaggants, upon being illuminated with an incident beam of light. It is clear that the apparent cumulative teaching of the foregoing prior art is that aerosol formulations containing glass beads with a particle size of about 10 to about 60 microns, preferably about 10 or 20 to about 45 microns, can be used in aerosol coating compositions to reflectorize a substrate. Also in accordance with the art, the beads should have some metallic reflector in back of or coated onto such particles. However, the fact remains that even though much of the art in this area has been in existence for decades, no such compositions are believed to have found commercial acceptance and none are believed to be currently commercially available.

The present invention is directed toward the still unsatisfied need for a convenient and speedy means for increasing the reflectivity of an object or substrate, such as an aerosol composition.

SUMMARY OF THE INVENTION

Quite surprisingly, a two-part aerosol composition has been discovered which dramatically increases the light reflectivity of a substrate or object to which it is applied. In accordance with the present invention, there has been discovered a two-part system for increasing the reflex-reflectivity of a substrate. The system comprises a first aerosol dispensing means containing a first coating composition capable of forming a base-coating on a substrate and a second aerosol dispensing means containing a second coating composition capable of imparting reflex-reflectivity to said base-coating. The first coating composition comprises a binder resin and a solvent in which the binder resin is dissolved, and also may contain one or more coloring agents such as pigments and dyes. The second coating composition contains transparent microspheres having a particle size from about 45 to about 90 microns and a carrier in which the transparent microspheres are dispersible. The carrier is also capable of softening or partially dissolving the binder resin in the base-coating. The binder resin, when in a softened or partially dissolved state, is capable of adhering said transparent microspheres to said substrate, and said transparent microspheres are capable of exhibiting reflex-relectivity after application to said base-coating.

The present invention also provides a two-step method for increasing the reflex-reflectivity of a substrate. The first step comprises first coating the desired substrate with a first aerosol coating composition to form a base-coating on said substrate, the first aerosol coating composition being dispensed from a self-pressurized aerosol dispenser means which contains the first coating composition and a propellant. The second step comprises coating the base-coat formed in the first step with a second aerosol coating composition to impart reflex-reflectivity to said base-coating, said second aerosol coating composition being dispensed from a self-pressurized aerosol dispenser means which contains said second coating composition and a propellant. The first coating composition comprises a binder resin and a solvent in which the binder resin is dissolved and may contain one or more coloring agents such as pigments and dyes. The second coating composition comprises transparent microspheres having a particle size from about 45 to about 90 microns and a carrier in which the transparent microspheres are dispersible. The carrier also is capable of softening or partially dissolving the binder resin in the base-coating and the binder resin, when in a softened or partially dissolved state, is capable of adhering said transparent microspheres to said substrate. Further, the transparent microspheres exhibit reflex-relectivity after application to said base-coating.

The present invention thus provides both a novel two-part aerosol system as well as a two-step method for increasing the reflectivity of an object or substrate, by use of the two-part aerosol system.

DETAILED DESCRIPTION OF THE PREFERRED EMBODIMENTS

As used in the present application, the term "reflex-reflectivity" includes the optical phenomena in which an incident beam of light is reflected back toward its source in the form of a cone having a small angle to the original incident ray of light. Such reflex-reflectivity allows an observer at a small angle from the line of incident light to still be within the cone of reflected light which is of relatively high intensity. For purposes of the present application, however, the actual shape of the reflected light is not critical and the term also is meant to encompass what some call retro-reflective which usually denotes an optical phenomenon in which the incident light beam is returned substantially along its original line of travel.

The transparent microspheres of use in the present invention are all generally spherical particles which are substantially transparent, exhibit the reflex-reflectivity as discussed above, and are of the appropriate size range. The chemical composition of the microsphere itself is not critical and may include compositions of the type used heretofore in the art, such as those previously referred to as "glass beads", so long as the aforementioned properties and size limits are satisfied.

The microspheres employed in the second aerosol coating composition of the present invention should have an index of refraction of at least about 1.5. One particular advantage of the present two-part aerosol system over that of copending application no. 07/384,227, filed July 21, 1989, concurrently herewith, is that what are sometimes termed "ordinary glass beads", i.e. transparent microspheres which have an index of refraction similar or identical with ordinary glass, may be employed. The foregoing is true because most of the transparent microspheres, when applied in accordance with the present two-step procedure, do not become covered by adhesive resin, but simply become embedded in the resin. Because the resin does not cover the front surface of the transparent microspheres, there is no diminution in the reflex-reflectivity of the transparent microspheres, and such transparent microspheres having relatively low indices of refraction can be employed.

Generally the transparent microspheres used in the second aerosol formulation of the present invention will have an index of refraction between about 1.5 and about 2.8 and typically from about 1.5 to about 1.9. Of course, as a general principle, the higher the index of refraction of the microspheres, the better the reflectivity of the composition.

Further, to provide a coating exhibiting high reflex-reflection under a variety of conditions, a composition having a mixture of microspheres (e.g., 1.5 index microspheres, 2.1 index microspheres and 2.8 index microspheres), may be desirable. Although transparent microspheres, from the standpoint of obtaining high reflectivity, preferably have a very high index of refraction, cost considerations may make the use of such beads prohibitive. Thus, less expensive microspheres made of cheaper articles and having lower indices of refraction may be preferable in some instances due to economic reasons.

Transparent microspheres are available commercially only in ranges of sizes, depending upon the screening protocol of an individual manufacturer. Although it is desirable to use microspheres with particle sizes from about 45 to about 90 microns, it may not be commercially possible to obtain a transparent microsphere supply having such definitive limits. For example, one typical supplier of transparent microspheres has available a size-range of microspheres from about 63 to about 88 microns. The presence of smaller miocrospheres does not detract from the operability of the present invention, but better performance is achieved when the larger microspheres are employed. The larger the microsphere the better the performance. The only limitation on the upper size of the microspheres relates to the particular aerosol means for dispensing the product. Aerosol valves and actuators are capable of spraying particulate matter up to given size ranges. For microspheres in the range of 45-90 microns, many valves and actuators work. For larger microspheres one needs to be somewhat more selective in the choice of valve and actuator. Although the upper size of the microspheres generally is a functional one, from a practical commercial standpoint, the transparent microspheres usually will have a particle size from about 45 to about 90 microns. As indicated, the microspheres need to be small enough to be sprayable from the self-pressurized aerosol means employed.

The present invention may also employ the reflective glass beads such as those described in U.S. Pat. No. 2,963,378. Each bead is a tiny glass sphere or spheroid which is transparent and reflectorized over approximately half its area, conveniently with a thin metallic reflector coating, such as a coating of aluminum, forming an integral hemispherical reflector cap. The use of such reflectorized beads, however, is not necessary to achieve operable performance in accordance with the present invention. Nor is it necessary to employ separate reflective metallic pigments or other materials to form reflective back coatings, as is done in U.S. Pat. No. 3,228,897.

The quantity of microspheres employed in the compositions used in the present invention may vary over some range. As a general principle, the amount of microspheres in the second aerosol formulation may vary from about 10 to about 80 percent, by weight. Typically, the quantity of glass beads will be from about 15 to about 60 percent, by weight, based on the total weight of the second aerosol formulation, and more typically will be from about 25 to about 50 percent, by weight. Functionally, the higher the concentration of glass beads, the more readily one can apply a sufficient quantity of transparent microspheres to the base coat, to obtain sufficient relex-reflectivity. However, as an upper functional limit, one also must have sufficient carrier present to soften the base coat sufficiently to allow for the adherence of the transparent microspheres to the substrate, through the base coat.

As used herein the terms aerosol means and self-pressurized aerosol and aerosol dispensing means are interchangeable and are meant to refer to any art-recognized, self-pressurized container which employs an internal propellant for the purpose of dispensing a component therefrom, via an integral valve and actuator system.

The type of binder resin used in the method and composition of the present invention is not critical so long as it is sufficiently adherent to securely attach the microspheres to a surface. The first coating composition may be free of coloring or opacifying agent, in which instance the resulting binder coating will be substantially transparent, allowing the color of the underlying substrate to be visible. Alternatively, the coating composition may include a coloring agent, such as pigment or dye. If a coloring agent is used in the first coating composition, it preferably produces a light color, in order to allow for maximum visibility of the underlying substrates.

Most importantly, with respect to the binder resin, it should be capable of being softened or partially dissolved by the carrier which is employed in the second coating composition. The softening allows the transparent microspheres to become partially embedded in the base coating formed by the first aerosol composition, and to become adhered thereto. If nonconvertible resin is employed in the first coating composition, the second coating composition may be applied at any time after the first coating composition becomes tacky on the desired substrate. However, if convertible resin is employed, the second coating composition may be applied from the time the coated substrate becomes tacky until the resin has completed curing.

Some examples of binder resin systems which will form suitable coatings include acrylate polymers and copolymers, polyurethanes, polyamide-modified alkyds, polyesters, ethylene vinyl acetate copolymers, and epoxies. Selection of a resin system will depend, in part, upon the type of surface coated. Elastomeric coatings derived from modified and synthetic rubbers and the like are useful for many applications. When such elastomeric coatings are desired, typical binder resins may comprise polychlorinated, cyclic, nitrile, butyl or polysulfide rubber; styrene-butadiene copolymer; butadiene-acrylonitrile copolymer; polyisoprenes; ethylene-propylene terpolymers; silicone rubber and the like. The preferred binder resins are acrylics.

The solvent employed in either the first or the second aerosol formulation of the present invention is not critical. Virtually any solvent which will dissolve the binder resin without dissolving the microspheres will be suitable. Examples of suitable solvents include aliphatic and aromatic solvents, ketones, esters, glycolethers, alcohols, halogenated hydrocarbons, and water.

Any suitable propellant for use in an aerosol may be used in accordance with the present invention. Thus, the typical liquefied propellants and compressed gases normally used in aerosol applications are suitable. Certain hydrocarbon propellants such as propane and butane and mixtures thereof are usually employed. The vapor pressure of the propellant system should be at least 13 pounds per square inch gauge (p.s.i.g.) at 70° F. Pressures up to 180 p.s.i.g. at 130° F. may safely be used with metal containers and up to 40 p.s.i.g. at 70° F. with specifically reinforced glass containers.

The first composition, as indicated, may include a coloring agent, such as a dye or a pigment. Typical dyes or pigments include titanium dioxide, chrome yellow (lead chromate), organic reds, phthalocyanine blue and phthalocyanine green. The pigments and other agents, such as talc (magnesium silicate), also may be used to act as bulking agents or fillers.

Other ingredients optionally incorporated into the compositions of the invention include suspending aids or other additives to enhance the invention. Preferably, an anti-settling agent is employed in the second coating composition and most preferably, the transparent microspheres are coated with the anti-settling agent before being dispersed into the carrier. Preferred anti-settling agents are metal stearates; most preferably magnesium stearate is employed, although zinc stearate is believed to be very similar in performance. The magnesium stearate may be introduced in any manner known or acceptable in the art. For example, the magnesium or other metal stearate simply may be added to a solvent, such as toluene, and heated to dissolve the stearate, or to aid in dispersing the same. After the solution or dispersion is formed, the transparent microspheres may be added, with stirring, to form the desired suspension of transparent microspheres comprising the second composition of use in the present invention. Other additives also may be employed, such as a coating aid to assist in immobilizing the microspheres after application to a surface and also to assist in the redispersion of the microspheres within the aerosol dispersing means. Typical additives for such purposes are clays and modified clays such as bentonite and the like.

The aerosol containers of use in accordance with the present invention may be of any generally recognized construction. Valves and actuators known in the aerosol industry for use in dispensing powders are of particular utility in dispersing the second aerosol composition containing the transparent microspheres. The PARC-39 valve manufactured by Seaquist and the SV-78 valve manufactured by Summit have been found to be of utility in the present invention. Similarly, the RKN-28 actuator (0.025") and the EXCEL-100 actuator have been found to be of particular utility in the practice of the present invention when the aforementioned Seaquist valve is employed. When the Summit SV-78 valve is employed, the standard Summit 0.023" actuator may be employed.

The following is an example of a typical composition of the invention for application by aerosol spraying (amounts are given in parts by weight)

| | FIRST AEROSOL COMPOSITION | |
|---|---|---|
| General | Most Preferred | |
| 1-75% | 13.8% | Rohm & Haas ACRYLOID B-67 (45% isobutylmethacrylate polymer in VM&P naphtha) |
| 0.1-5% | 3.4% | Xylene |
| 0.1-10% | 7.4% | Additives and Fillers |
| 1-85% | 36.5% | Toluene |
| 3-50% | 30% | A-70 Propellant (propane and butane blend with a 70 psig pressure at 70° F.) |
| 0-15% | 8.9% | Coloring Agent |

| | SECOND AEROSOL COMPOSITION | |
|---|---|---|
| General | Most Preferred | |
| 3-50% | 30% | A-70 Propellant (propane and butane blend with a 70 psig pressure at 70° F.) |
| 20-80% | 35% | Transparent microspheres 45-90 microns |
| 10-50% | 26% | Toluene |

A suitable aerosol valve system for applying the above composition to the surface of an object is described as follows:
  Valve: Seaquist PARC-39 (0.025" stem orifice, 0.020" vapor tap)
  Actuator: RKN-28

The compositions and method in accordance with the present invention will now be described. It should be understood, however, that the examples are not intended to delineate the scope of the invention nor to limit the appended claims. In the examples which follow, the composition and method described above were employed. In the examples, the quantities of material are expressed in terms of percentages by weight of the total composition, unless otherwise specified.

EXAMPLE 1

This example demonstrates a commercial-scale procedure for manufacturing the compositions of and for use in the present invention.

FIRST COATING COMPOSITION

The components employed in this composition and the quantity thereof are as follows:

| Parts by Weight | Component |
|---|---|
| 19.7 | Rohm & Haas ACRYLOID B-67 Resin (45% isobutylmethacrylate polymer in VM&P naphtha) |
| 2.1 | NUOSPERSE 700 dispersing agent |
| 1.3 | MPA 1078X antisettling agent |
| 2.4 | Talc (magnesium silicate) filler |
| 4.8 | Calcium carbonate |
| 12.7 | Titanium dioxide |
| 4.8 | Xylene |
| 52.2 | Toluene |

One half of the resin is dissolved in the total quantity of xylene. The NUOSPERSE dispersing agent and MPA 1078X antisettling agents are then added with mixing to uniformly disperse the same. The talc, calcium carbonate, and titanium dioxide are then sifted into the formulation and subsequently ground on a high speed disperser. The remainder of the resin is added while mixing. After thorough mixing, the toluene is added. Finally, 70 parts of the formulation are filled along with 30 parts of A-70 propellant (propane and butane blend with a 70 p.s.i.g. pressure at 70° F.) into any appropriate aerosol dispensing means.

SECOND COATING COMPOSITION

One hundred fifty (150.0) pounds of toluene are heated to 110° C. and 12.0 pounds of magnesium sterate are added thereto, while mixing, with continued heating to dissolve the magnesium stearate. The sufficiency of dissolution is determined by placing a small quantity of the solution into a clear glass container and allowing the same to dry. If a clear transparent film results, then the dissolution is complete. The composition is then allowed to cool naturally to ambient temperature and an additional 200.0 pounds of toluene is added thereto, along with twelve pounds of Aromatic 100 solvent.

To 100 pounds of the foregoing composition, 40 pounds of transparent microspheres (Potter 24–30 beads, having a particle size of 45 to 90 microns) are added with thorough mixing to obtain a uniform dispersion of the beads. Sixty pounds of A-70 propellant (propane and butane blend with a 70 p.s.i.g. pressure at 70° F.) is added and subsequently packaged into an aerosol dispenser which includes a Seaquist PARC-39 valve with a 0.025 inch stem orifice, a 0.020 inch vapor tap and an RKN-28 actuator).

APPLICATION TO SUBSTRATE

The first composition was dispensed from the aerosol dispensing means onto a metallic substrate to form a uniform coating thereon. Subsequently, the second coating composition was dispensed from the aerosol dispensing means to uniformly cover the substrate previously coated with the first coating composition. The resultant coated substrate was found to exhibit reflex-reflectivity.

What is claimed is:

1. A two-step method for increasing the reflex-reflectivity of a substrate, said method comprising first coating said substrate with a first aerosol coating composition to form a base-coating on said substrate, the first aerosol coating composition being dispensed from a self-pressurized aerosol dispenser means which contains said first coating composition and a propellant; and secondly coating said base-coating with a second aerosol coating composition to impart reflex-reflectivity to said base-coating, said second aerosol coating composition being dispensed from a self-pressurized aerosol dispenser means which contains said second coating composition and a propellant; said first coating composition comprising a binder resin and a solvent in which the binder resin is dissolved; said second coating composition comprising transparent microspheres having a particle size from about 45 to about 90 microns and a carrier in which the transparent microspheres are dispersible, said carrier also being capable of softening or partially dissolving the binder resin, in the base-coating; said binder resin when in a softened or partially dissolved state, being capable of adhering said transparent microspheres to said substrate; and said transparent microspheres exhibiting reflex-relectivity after application to said base-coating.

2. The method of claim 1 wherein the first aerosol coating composition also comprises a coloring agent.

3. The method of claim 2 wherein the microspheres have an index of refraction between about 1.5 and about 2.8.

4. The method of claim 3 wherein the microspheres have an index of refraction between about 1.5 and about 1.9.

5. The method of claim 4 wherein the quantity of microspheres in the second composition, based upon the total weight of the composition, is from about 10 to about 80 percent.

6. The method of claim 4 wherein the quantity of microspheres in the second composition is from about 25 to about 50 percent.

7. The method of claim 6 also comprising a suspending aid in the second aerosol coating composition.

8. The method of claim 7 wherein the suspending aid is selected from the group consisting of clays and modified clays.

* * * * *